(12) United States Patent
Song et al.

(10) Patent No.: US 10,499,089 B2
(45) Date of Patent: Dec. 3, 2019

(54) SYSTEM FOR PROVIDING CLOUD-BASED USER INTERFACES AND METHOD THEREFOR

(71) Applicant: ALTICAST CORPORATION, Seoul (KR)

(72) Inventors: Moon Kyu Song, Seongnam-si (KR); Woo Hyuck Kim, Hwaseong-si (KR); Hyun Il Jung, Seoul (KR)

(73) Assignee: ALTICAST CORPORATION, Seoul (KR)

( * ) Notice: Subject to any disclaimer, the term of this patent is extended or adjusted under 35 U.S.C. 154(b) by 0 days.

(21) Appl. No.: 15/828,433

(22) Filed: Dec. 1, 2017

(65) Prior Publication Data
US 2018/0160154 A1 Jun. 7, 2018

(30) Foreign Application Priority Data
Dec. 7, 2016 (KR) ........................ 10-2016-0166233

(51) Int. Cl.
| | | |
|---|---|---|
| G06F 3/00 | (2006.01) | |
| G06F 13/00 | (2006.01) | |
| H04N 5/445 | (2011.01) | |
| H04N 21/231 | (2011.01) | |
| H04N 21/431 | (2011.01) | |
| H04N 21/235 | (2011.01) | |
| H04N 21/443 | (2011.01) | |
| H04N 21/45 | (2011.01) | |

(52) U.S. Cl.
CPC ... *H04N 21/23106* (2013.01); *H04N 21/2358* (2013.01); *H04N 21/4312* (2013.01); *H04N 21/4435* (2013.01); *H04N 21/4516* (2013.01)

(58) Field of Classification Search
CPC ......... H04N 21/23106; H04N 21/2358; H04N 21/4312; H04N 21/4435; H04N 21/4516; H04N 21/47; H04N 21/8173
USPC ..................................... 725/38, 89, 134, 145
See application file for complete search history.

(56) References Cited

U.S. PATENT DOCUMENTS

| | | | |
|---|---|---|---|
| 7,673,250 B2 * | 3/2010 | Taylor ................ | H04N 5/44504 345/619 |
| 9,294,785 B2 | 3/2016 | Brockmann et al. | |
| 2007/0260749 A1 | 11/2007 | Lahdensivu | |
| 2007/0299976 A1 * | 12/2007 | Zafar .................. | H04L 61/1582 709/229 |
| 2011/0072452 A1 * | 3/2011 | Shimy .................... | H04N 7/163 725/25 |
| 2011/0296460 A1 * | 12/2011 | Jin ..................... | H04N 21/2393 725/37 |
| 2013/0091525 A1 | 4/2013 | Yoon et al. | |
| 2014/0040968 A1 | 2/2014 | Kitazato et al. | |

(Continued)

FOREIGN PATENT DOCUMENTS

| | | |
|---|---|---|
| EP | 3001311 A1 | 3/2016 |
| WO | 2006130727 A2 | 12/2006 |

*Primary Examiner* — Nnenna N Ekpo

(57) ABSTRACT

Disclosed are a system for providing cloud-based user interfaces (UIs) which controls rendering of content and a UI resource by reusing a UI object stored in a subscriber terminal device, and a method thereof. By the system for providing cloud-based UIs of the present disclosure and the method thereof, the amount of a control command transmitted to the subscriber terminal device from a remote application server may be drastically reduced.

16 Claims, 8 Drawing Sheets

(56) References Cited

U.S. PATENT DOCUMENTS

2016/0110080 A1* 4/2016 Bertram .............. G06F 3/04842
　　　　　　　　　　　　　　　　　　715/753
2016/0134910 A1* 5/2016 Davis ....................... H04N 5/76
　　　　　　　　　　　　　　　　　　725/27

* cited by examiner

SYSTEM FOR PROVIDING CLOUD-BASED USER INTERFACES AND METHOD THEREFOR

CROSS-REFERENCE TO RELATED APPLICATION

This application claims priority under 35 U.S.C 119(a) to Korean Patent Application No. 10-2016-0166233, filed on Dec. 7, 2016 in the Korean Intellectual Property Office, the disclosure of which is incorporated herein by reference.

BACKGROUND OF THE DISCLOSURE

Field of the Disclosure

The present disclosure relates to a system for providing cloud-based UIs which reuses a UI object stored in a subscriber terminal device to render a scene for a user interactive input, and a method therefor.

Description of the Related Art

The current broadcasting environment including technology development trends and business trends of pay-TV broadcasters is changing to an Internet-based environment or a hybrid type partially combined with an Internet-based environment.

In addition, consumption patterns for media have diversified due to the emergence of various smart access devices and new advanced technologies, such HTML5 and UHD, have emerged. Accordingly, there are capital requirements such as purchase of a high-performance Set-Top Box (STB), reorganization of User Interface (UI)/User Experience (UX), development of new services, and upgrade of a head-end system. Such capital requirements are a burden on pay-TV broadcasters.

Pay-TV broadcasters are constantly trying to develop technologies to meet changing trends so as to have a competitive edge over existing pay-TV broadcasters or new media operators such as Over-The-Top (OTT) operators, Google TV, and Apple TV.

Accordingly, pay-TV broadcasters are replacing their existing set-top boxes with high-performance models, adding Internet-based services, and analyzing various viewer needs to add recommendation, search, and personalization functions, are applying multi-screen technology that enables media consumption in various devices, and are investing in photography, editing, encoder, and network equipment to provide UHD-quality video beyond HD.

However, it is difficult to simultaneously replace existing head-end systems and set-top boxes that have been made through large-scale investment, either in financial terms or in terms of time. That is, it took considerable time and cost for the existing broadcasting system to provide real-time broadcast, VoD, and other interactive services, and it is costly to develop a service that can meet customer's demands.

There is a need for a technology capable of solving the problems faced by pay broadcasting companies, breaking away from the existing one-way broadcasting environment, and providing consistent UI/UX to various set-top boxes and media devices utilizing the advantages of the two-way broadcasting environment. In addition, there is a need for a technology capable of providing Internet-based services (social networking, recommendation, search, personalization) and facilitating complex UI/UX change and test for each set-top box model.

According to such need, technologies capable of providing UIs from a cloud-based server to a subscriber device have been proposed. However, due to the nature of a computing process of the cloud-based server, problems such as increased bandwidth and server load for processing have occurred.

In addition, when a session connection is not smooth due to a communication failure between a cloud-based server and a subscriber device, there is a problem that a user cannot be provided with a smooth service.

To address the problems of the related art, a cloud-based UI provision system through generation of a cloud-based control command has been developed. The cloud-based UI provision system using a control command system receives content and UI resources from a media storage in a subscriber terminal device having received a control command and controls rendering of the received content and UI resources, thereby addressing load reduction and communication trouble in a cloud server.

Further, to increase efficiency of a cloud-based UI provision system in a control command manner, development of a technique for reducing a transmission amount of a control command has been developed in recent years.

RELATED ART DOCUMENTS

Patent Documents (Patent Documents 1) U.S. Patent Application Publication No. 2011/0296460 entitled "method and apparatus for providing remote user interface (UI) service," published on Dec. 1, 2011.

(Patent Documents 2) U.S. Patent Application Publication No. 2013/0091525 entitled "METHOD AND APPARATUS FOR PROVIDING CLOUD-BASED USER MENU," published on Apr. 11, 2013.

(Patent Documents 3) U.S. Pat. No. 9,294,785 entitled "system and method for exploiting scene graph information in construction of an encoded video sequence," registered on Mar. 22, 2016.

SUMMARY OF THE DISCLOSURE

Therefore, the present invention has been made in view of the above problems, and it is one object of the present invention to provide a cloud-based UI provision system reusing a UI object stored in a subscriber terminal device in correspondence with user interactive input in a current session connection to control content and a UI resource to be rendered in a subscriber terminal device, and a method therefor.

It is another object of the present invention to provide a cloud-based UI provision system capable of drastically reducing an amount of control commands transmitted to a subscriber terminal device from a remote application server by reusing a UI object stored in a subscriber terminal device, and a method therefor.

It is another object of the present invention to provide a cloud-based UI provision system allowing cost reduction in developing an application directly related to introduction of a new services or service experience of customers, due to reception of content and a UI resource to a subscriber terminal device from a storage separated from a remote application server according to a control command of the remote application server and rendering of the content and the UI resource, and a method therefor.

It is another object of the present invention to provide a cloud-based UI provision system capable of significantly reducing a load of a remote application server because a remote application server does not perform a process of obtaining content and a UI resource and combining the obtained content and UI resource, and a method therefor.

It is another object of the present invention to provide a cloud-based UI provision system providing consistent UIs to a subscriber device without development, porting, and test of applications for different STB types having different specification to allow rapid service launch and customer satisfaction increase, and a method therefor.

It is yet another object of the present invention to provide a cloud-based UI provision system reducing subscriber terminal device purchase cost and service development cost by providing UIs capable of being implemented even in a low-performance subscriber terminal device, and a method therefor.

In accordance with an aspect of the present invention, the above and other objects can be accomplished by the provision of a remote application server including a UI reuse determining processor configured to query whether to store a UI resource to the subscriber terminal device in a current session connection with a subscriber terminal device in correspondence with a user interactive input and determines to reuse a saved UI object stored in the subscriber terminal device based on response information to the query; a control command generator configured to generate a control command for rendering the saved UI object stored in the subscriber terminal device and at least one of content and a UI resource in correspondence with a determination result of the UI reuse determining processor; and a controller configured to control generation of the control command and transmission of the generated control command to the subscriber terminal device.

The controller may control generation of a control command to reuse the stored saved UI object corresponding to the user interactive input.

The subscriber terminal device may render a scene corresponding to the user interactive input by reusing the stored saved UI object in correspondence with a received control command.

The UI reuse determining processor may determine whether to update the stored saved UI object by analyzing version information of the stored saved UI object based on the response information, and the controller may generate a control command to update the stored saved UI object and controls the generated control command to be transmitted to the subscriber terminal device.

The subscriber terminal device may update the stored saved UI object in correspondence with the control command and may overwrite and store the updated saved UI object in the stored saved UI object.

The subscriber terminal device may receive at least one of content and a UI resource from a media storage in correspondence with the control command, and may combine and render the stored saved UI object and at least one of the received content and UI resource.

The UI reuse determining processor may determine whether to change at least one characteristic of the saved UI object stored in the subscriber terminal device based on response information to the query, and the controller may control generation of a control command corresponding to a user interactive input by changing the determined at least one characteristic.

The subscriber terminal device may receive the generated control command, change the at least one characteristic of the stored saved UI object in correspondence with the received control command, and render a scene corresponding to the user interactive input by reusing the saved UI object having a changed characteristic.

The at least one characteristic may include information on at least one of a position, color, texture, and transparency of a UI object in a scene.

The subscriber terminal device may store the saved UI object having a changed characteristic.

The subscriber terminal device may store information on the at least one characteristic in correspondence with the stored saved UI object.

The controller, when the UI reuse determining processor determines that the saved UI object stored in the subscriber terminal device is absent based on the response information, may control generation of a control command to render a scene corresponding to the user interactive input, and the subscriber terminal device may receive at least one of content and a UI resource from a media storage in correspondence with the control command to render the scene.

The subscriber terminal device may selectively store a UI object used for rendering of the scene.

In accordance with another aspect of the present invention, there is provided a subscriber terminal device including a save UI controller configured to receive a query about whether to store a UI resource from a remote application server in a current session connection in correspondence with a user interactive input, determine whether to store a saved UI object in correspondence with the query, and return response information to the remote application server; a resource receiver configured to request at least one of content and a UI resource to a media storage in correspondence with a control command received from the remote application server and receives at least one of content and a UI resource corresponding to the request; and a renderer configured to reuse the stored saved UI object in correspondence with the received control command or renders a scene corresponding to the user interactive input from the stored saved UI object and at least one of the content and UI resource received from the resource receiver.

The renderer may render the scene by reusing a received saved UI object.

The save UI controller may update, overwrite, store the stored saved UI object.

The renderer may change the at least one characteristic of the stored saved UI object in correspondence with the received control command to render a current scene.

The subscriber terminal device may further include a save UI storage storing the saved UI object.

The save UI storage may be a nonvolatile memory.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, embodiments of the present invention are described with reference to the accompanying drawings and the description thereof but are not limited thereto.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or " comprising," when used in this specification, specify the presence of stated constituents, steps, operations, and/or devices, but do not preclude the presence or addition of one or more other constituents, steps, operations, and/or devices.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the invention and the appended claims, the singular forms "a", "an" and "the" are intended to include the plural forms as well, unless context clearly indicates otherwise.

Further, terms such as "first" and "second" are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1:
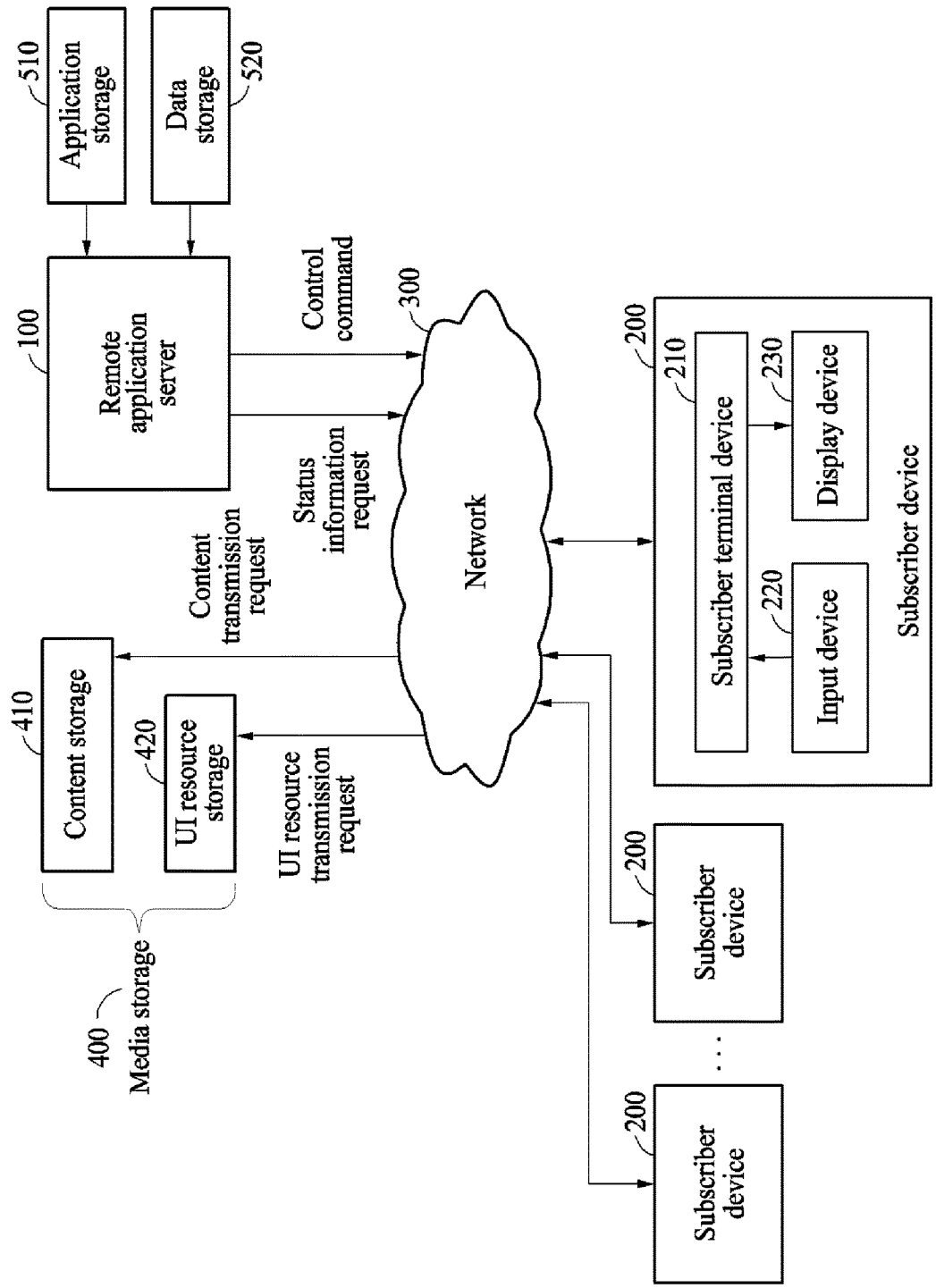
FIG. 1 illustrates a cloud-based UI provision system according to an embodiment of the present disclosure.

FIG. 1 illustrates a cloud-based UI provision system according to an embodiment of the present disclosure.

Referring to FIG. 1, the cloud-based UI provision system according to an embodiment of the present disclosure includes a remote application server 100 and a subscriber device 200.

The remote application server 100 according to an embodiment of the present disclosure analyzes status information on a subscriber terminal device 210, generates a control command according to the analyzed status information, transmits the generated control command to the subscriber device 200, and controls the subscriber terminal device 210 based on the control command or controls rendering for at least one of content and a UI resource in the subscriber terminal device 210.

In particular, the remote application server 100 collects status information on the subscriber terminal device 210 in the subscriber device 200 through the network 300, and generates a control command for controlling rendering of at least one of content and a UI resource in the subscriber terminal device 210 from the collected status information.

In addition, the remote application server 100 may generate a control command for controlling a function of the subscriber terminal device 210 per se.

The remote application server 100 transmits the generated control command to the subscriber device 200 through the network 300.

Status information according to an embodiment of the present disclosure may be information associated with the subscriber terminal device 210 enabling the subscriber terminal device 210 to perform a specific function by a control command from the remote application server 100.

For example, the status information may include at least one of resolution information and display screen rotation information of a display device 230 interworking with the subscriber terminal device 210, information on a device such as an input device 220 interworking with the subscriber terminal device 210, and service subscription information.

The status information is generated from the subscriber terminal device 210 along with session connection information upon session connection between the remote application server 100 and the subscriber terminal device 210 to be transmitted to the remote application server 100, and is generated from the subscriber terminal device 210 in correspondence with user input to be transmitted to the remote application server 100.

The remote application server 100 of the present disclosure may be a head-end system or a cloud-based media provision server, may receive an application for providing a service from an application storage 510, and may receive data, such as subscriber information, media information, or social network-associated information, from the data storage 520.

The subscriber terminal device 210 in the subscriber device 200 performs a function thereof according to a received control command, or receives at least one of content and a UI resource from a content storage 410 and a UI resource storage 420, which are separated from the remote application server 100, through the network 300 to perform rendering.

The subscriber terminal device 210 receives a control command from the remote application server 100, and requests transmission of media, such as content and a UI resource, to a media storage 400 based on the received control command. The media storage 400 may include the content storage 410 and the UI resource storage 420 depending upon a type or shape of stored media.

In particular, the subscriber terminal device 210 requests transmission of a content to the content storage 410 based on the received control command, requests transmission of a UI resource to the UI resource storage 420 to receive content from the content storage 410, and receives the UI resource from the UI resource storage 420.

Subsequently, the subscriber terminal device 210 performs rendering of at least one of the received content and UI resource based on the control command received from the remote application server 100.

According to an embodiment, the subscriber device 200 may request or receive content through a content channel formed with the content storage 410 based on a control command, and may request or receive a UI resource through a UI resource channel formed with the UI resource storage 420.

The UI resource may be implemented using at least one of a web page, a bitmap for an application, and a graphic primitive for an application.

According to an embodiment, the UI resource may include a business service and a user interface receiving input of a user command for controlling the subscriber device 200 from the outside.

In addition, according to another embodiment, the subscriber terminal device 210 determines whether a session connection with the remote application server 100 is normal and, when a session connection is not smooth, may provide a user interface to a user based on a hybrid control command to control generation of status information and reception of a resource related to rendering.

The subscriber device 200 may include the subscriber terminal device 210, the input device 220, and the display device 230, and, as illustrated in FIG. 1, at least one subscriber device 200 may be present.

The subscriber terminal device 210 of the present disclosure may be, without being limited to, an electronic device equipped with a wired/wireless communication module, such as a set-top terminal (STT), a set-top box (STB), a communication terminal, a PC, a mobile communication terminal, a smartphone, a notepad, a PDA, or a tablet PC, or a terminal device capable of connecting to and communicating with at least one of the remote application server 100, the content storage 410 and the UI resource storage 420 through the network 300.

According to an embodiment, the subscriber terminal device 210 may be a terminal device capable of processing a signal, a bandwidth control process, and a graphics processing process.

In particular, the subscriber terminal device 210 may be a terminal device that performs a graphics processing process such as a process of receiving an MPEG-2 transmission stream for a content including video content and audio content, decoding the content, and rendering the decoded content.

In addition, the subscriber terminal device 210 performs rendering of a local UI resource and received media (UI resource and content resource) stored and maintained in the subscriber terminal device 210 to provide a function, such as an Electronic Program Guide (EPG), VOD, or a digital video recorder (DVR), to a user.

The input device 220 may be a device, such as a remote control, a keyboard, or a touchscreen device, capable of receiving input from a user.

The subscriber terminal device 210 may receive an interaction-based user input based on bidirectionality for content and a UI resource rendered and supplied through the display device 230 from the input device 220.

For example, the user input may include various signals such as a stream request, session initialization, and a click-stream.

According to an embodiment, the subscriber terminal device 210 may directly correspond to a user input to perform rendering for a resource, without depending upon a control command from the remote application server 100, according to a type of a user input received through the input device 220.

For example, when a user input is reprocessed in accordance with a resource state provided to a current user, status information transmission to the remote application server 100 may be unnecessary during reprocessing of a resource. That is, the subscriber terminal device 210 may correspond to a user input received through the input device 220 to perform direct processing of a resource.

The display device 230 may be a device providing a visual or auditory content or UI resource, such as a television, a computer monitor, a communication monitor, or a smartphone display, to a user.

The content storage 410 may store and maintain content such as video content, audio content, a real-time TV broadcast program, an on-demand program, SNS information, a chat message, a product, and an application.

According to an embodiment, the content storage 410 may store content to which content or specific protocol of a format corresponding to a specific protocol, such as an MPEG-2 transport packet, MPEG-4, or DVB, is not applied.

As another example, the content storage 410 may store content partitioned in a predetermined manner.

In the case of real-time broadcast content, the remote application server 100 may control such that the content storage 410 obtains the broadcast content, partitions the obtained broadcast content in a predetermined manner, and stores the partitioned broadcast content. In this case, the content storage 410 may separately store and manage broadcast schedule information to obtain and store broadcast content.

For example, the remote application server 100 analyzes status information on the subscriber terminal device 210 and, when the analyzed status information is a reception standby state of partitioned and stored broadcast content, the remote application server 100 generates a control command for transmitting the partitioned and stored broadcast content and transmits the partitioned and stored broadcast content to the subscriber terminal device 210.

The subscriber terminal device 210 having received the control command may transmit a transmission request of the broadcast content to the content storage 410 based on the control command, and the content storage 410 may extract at least one content partition suitable for a corresponding request after searching additional data for the partitioned content, may synthesize the extracted at least one content partition to process as user content, and may transmit the processed content to the subscriber terminal device 210.

Here, the content storage 410 may transmit a corresponding content to the subscriber terminal device 210 or another client device (not shown) by downloading or streaming.

In addition, the content storage 410 may store at least one of broadcast content, content partition, and user content in a cloud storage space, and may also continuously provide content such that continuous content playback ('N-screen service') among a plurality of client devices held by a user is possible.

To accomplish this, the remote application server 100 or the content storage 410 may separately store and manage content playback history for each client device.

According to another embodiment, the remote application server 100 may control such that corresponding content and UI resource are differently transmitted from the content storage 410 and the UI resource storage 420 to the at least one subscriber device 200 according to various communication protocols.

That is, the first subscriber device and the second subscriber device may receive content and a UI resource using different protocols.

The remote application server 100 according to an embodiment of the present disclosure queries whether to store a UI resource to the subscriber terminal device in a current session connection with a subscriber terminal device in correspondence with a user interactive input, and determines reuse of a saved UI object stored in the subscriber terminal device 210 based on response information to the query.

The remote application server 100 determines reuse of the saved UI object stored in the subscriber terminal device 210 to generate a control command to reuse the UI object stored in the subscriber terminal device 210, and controls rendering of a scene corresponding to a user interactive input in the subscriber terminal device 210 based on the generated control command.

The saved UI object refers to a UI object used during rendering to configure a previous scene in correspondence with a user interactive input after session connection and stored in the subscriber terminal device 210, and may be an object included in a UI resource used during scene configuration in a previous session connection.

Subsequently, when the remote application server 100 receives a response for storage of the saved UI object from the subscriber terminal device 210, the remote application server 100 reuses the saved UI object stored in the subscriber terminal device 210 to generate a control command for rendering a scene corresponding to the user interactive input, and transmits the generated control command to the subscriber terminal device 210.

For example, when the remote application server 210 receives response information on storage of the saved UI object from the subscriber terminal device 210, the remote application server 210 may generate a control command for reusing the saved UI object.

The subscriber terminal device 210 may return a response to storage in correspondence with a query about storage of the saved UI object from the remote application server 100.

When the subscriber terminal device 210 returns that the saved UI object in a previous session connection is stored, the subscriber terminal device 210 may reuse the saved UI object from the remote application server 100 to receive a control command for rendering a configuration of a current scene, and reuses the stored saved UI object in correspondence with the received control command to render a scene corresponding to a user interactive input to a display device.

According to an embodiment, the subscriber terminal device 210 may receive at least one of content and a UI resource from a media storage in correspondence with a control command, and may perform rendering of a current scene by combining the stored saved UI object and at least one of the received content and UI resource.

In addition, according to an embodiment, the remote application server 100 may generate a control command for rendering a current scene by changing at least one characteristic of the saved UI object stored in the subscriber terminal device 210 in correspondence with the current scene state. The at least one characteristic may include information on at least one of a position, color, texture, and transparency of a UI object in a scene.

For example, the remote application server 100 may analyze metadata of a saved UI object analyzed from response information, and may control generation of a control command for changing at least one characteristic of the stored saved UI object based on the analyzed metadata.

In addition, the remote application server 100 analyzes version information of the stored saved UI object based on response information to determine whether to update the stored saved UI object, and generates a control command for updating the stored saved UI object to control to be transmitted to the subscriber terminal device 210.

For example, the remote application server 100 may generate a control command to update a new-version saved UI object from version information on the saved UI object when the stored saved UI object is an old-version object.

As described above, the subscriber terminal device 210 may change at least one characteristic of the stored saved UI object in correspondence with a received control command to render a scene corresponding to a user interactive input.

In addition, the subscriber terminal device 210 may combine the saved UI object having a changed characteristic and at least one of content and UI resource received from a media storage and may render the same to a display device.

In addition, the subscriber terminal device 210 may re-store the reused saved UI object in correspondence with a current scene state.

According to an embodiment, the subscriber terminal device 210 may overwrite and store the saved UI object having a changed characteristic, and may store, along with the saved UI object having a changed characteristic, information on at least one characteristic in correspondence with the stored saved UI object having a changed characteristic.

In addition, when a control command to update the stored saved UI object is received from the remote application server 100, the subscriber terminal device 210 may overwrite and store the updated saved UI object, and may store, along with the updated saved UI object, information on at least one characteristic in correspondence with the stored saved UI object.

Figure 2:
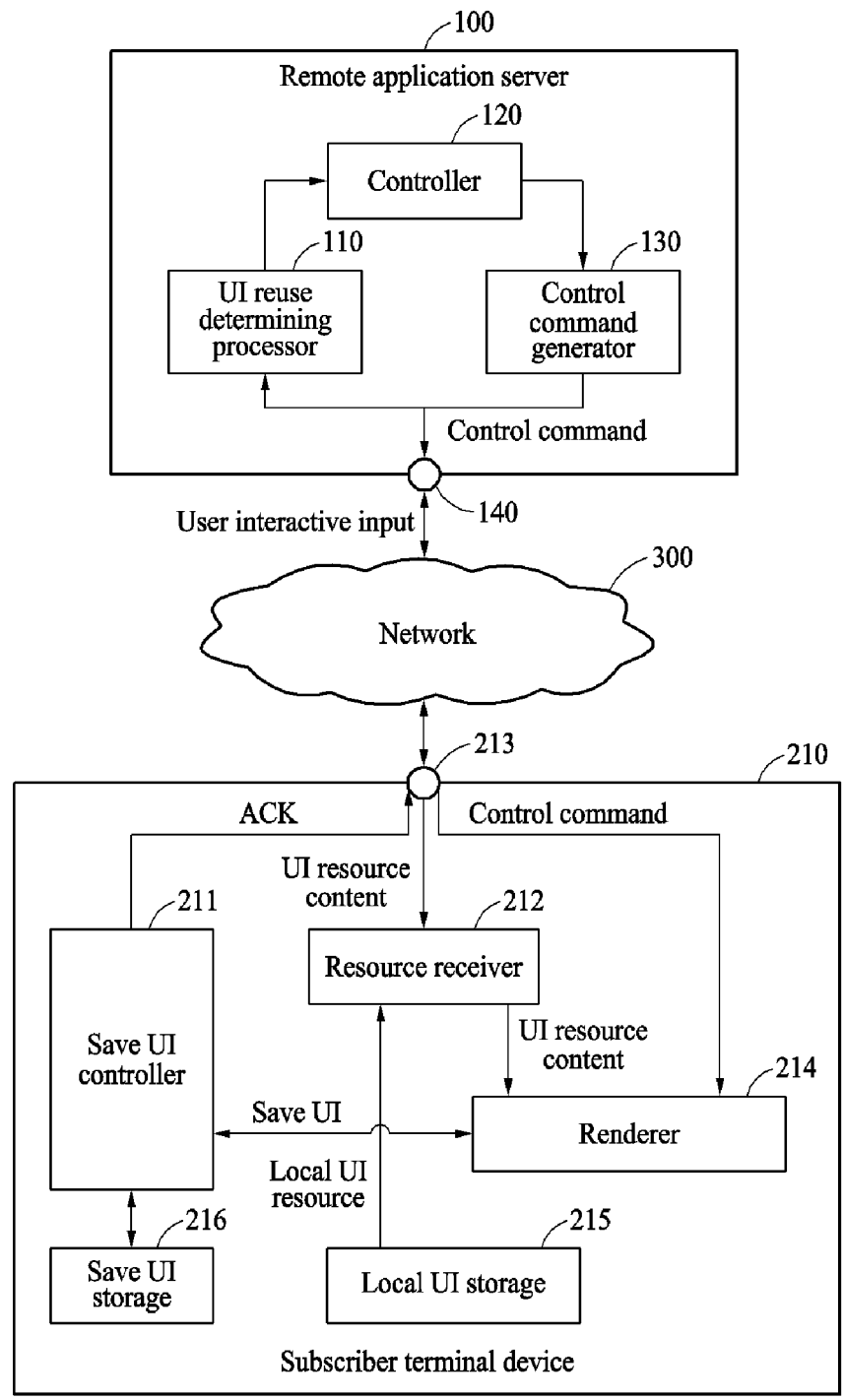
FIG. 2 illustrates configurations of a remote application server and a subscriber terminal device in a cloud-based UI provision system according to an embodiment of the present disclosure.

FIG. 2 illustrates configurations of a remote application server and a subscriber terminal device in a cloud-based UI provision system according to an embodiment of the present disclosure.

The remote application server 100 according to an embodiment of the present disclosure queries whether to store a UI resource in a current session connection with a subscriber terminal device in correspondence with a user interactive input to the subscriber terminal device, determines whether to reuse the saved UI object stored in the subscriber terminal device 210 based on response information to the query, generates a control command to reuse the UI object stored in the subscriber terminal device 210, and transmits the generated control command to the subscriber terminal device 210.

The subscriber terminal device 210 receives a control command to render a configuration of a scene corresponding to a user interactive input by reusing the saved UI object from the remote application server 100 in correspondence with the received control command, and uses the stored saved UI object in correspondence with the received control command to render the scene corresponding to the user interactive input to a display device.

To accomplish this, the remote application server 100 according to an embodiment of the present disclosure includes a UI reuse determining processor 110, a control command generator 130, and a controller 120.

The UI reuse determining processor 110 queries the subscriber terminal device 210 as to whether to store a UI resource in a current session connection with the subscriber terminal device 210, and determines whether to reuse the saved UI object stored in the subscriber terminal device 210 based on response information to the query.

The UI resource may be constituted of a plurality of UI objects such as a web page object implemented in correspondence with a user interactive input during session connection, a bitmap for an application image, and a graphic primitive for an application. According to an embodiment, the UI resource may include a user interface object receiving a user command for controlling a business service and the subscriber terminal device 210 from the outside.

The control command generator 130 generates a control command for rendering the saved UI object stored in the subscriber terminal device 210 and at least one of content and a UI resource in correspondence with a determination result of the UI reuse determining processor 110.

The saved UI object refers to a UI object that is used upon rendering to configure a previous scene in correspondence with a user interactive input after session connection and is stored in the subscriber terminal device 210, and may be an object included in a UI resource used during configuration of a previous scene.

A controller 120 controls generation of a control command and transmission of the generated control command to the subscriber terminal device 210.

In particular, the controller 120 may control generation of a control command to reuse the saved UI object when a response as to storage of the saved UI object is received from the subscriber terminal device 210.

The UI reuse determining processor 110 may determine whether to change at least one characteristic of the saved UI object stored in the subscriber terminal device 210 based on response information to a query, and the controller 120 may change the determined at least one characteristic to control generation of a control command corresponding to the user interactive input.

In addition, the UI reuse determining processor 110 may analyze version information on the stored saved UI object based on response information to determine whether to update the stored saved UI object, and the controller 120 generates a control command for updating the stored saved UI object to control the generated control command to be transmitted to the subscriber terminal device 210.

For example, the UI reuse determining processor 110 may generate a control command for update to a new-version saved UI object when the stored saved UI object is an old-version object based on version information on the saved UI object.

In addition, the UI reuse determining processor 110 may analyze metadata of the saved UI object analyzed based on response information, and the controller 120 may control generation of a control command to change at least one characteristic of the stored saved UI object based on the analyzed metadata.

The at least one characteristic may include information on at least one of a size, position, color, texture, and transparency of a UI object in a scene.

In addition, the remote application server 100 according to an embodiment of the present disclosure may further include a transport module 140 forming a signal path with the subscriber terminal device 210 associated with user interactive input, status information reception, and transmission of a control command through the input device 220 of the subscriber device 200.

Preferably, the signal path may form a single path with a transport module 213 of the subscriber terminal device 210.

The remote application server 100 may efficiently control the subscriber terminal device 210 through a signal path of the transport module 140.

For example, the remote application server 100 may effectively control authentication with a local application installed in the subscriber terminal device 210 and the subscriber terminal device 210 through the transport module 140.

The subscriber terminal device 210, when a query as to whether to store the saved UI object is received from the remote application server 100, returns a response for the query in correspondence with the query, receives a control command to render a configuration of a current scene by reusing the saved UI object from the remote application server 100, and reuses the stored saved UI object in correspondence with the received control command to render a scene corresponding to a user interactive input to a display device.

The subscriber terminal device 210 according to an embodiment of the present disclosure performs a function of the subscriber terminal device 210 per se according to a control command received from the control command generator 130, or receives at least one of content and a UI resource from a media storage separated from the remote application server 100 through the network 300 and performs rendering.

The media storage may include a content storage and a UI resource storage depending upon a type or shape of stored media.

In particular, the subscriber terminal device 210 may request transmission of content to a content storage based on the received control command, may request transmission of a UI resource to a UI resource storage to receive the content from the content storage, and may receive the UI resource from the UI resource storage 420.

Subsequently, the subscriber terminal device 210 performs rendering of at least one of the content and UI resource received from the media storage based on a control command received from the control command generator 130.

According to an embodiment of the present disclosure, the subscriber terminal device 210 may receive at least one of content and a UI resource from a media storage in correspondence with a control command so as to reuse the stored saved UI object, and may render a current scene by combining the stored saved UI object with at least one of the received content and UI resource.

To accomplish this, the subscriber terminal device 210 according to an embodiment of the present disclosure includes a save UI controller 211, a resource receiver 212, and a renderer 214.

The save UI controller 211 receives a control command that queries whether to store the saved UI object from the remote application server 100, determines whether to store the saved UI object, and returns response information to the remote application server 100 in correspondence with the received control command.

The response information may include information on whether to store the saved UI object and additional information. The additional information refers to information on the saved UI object such as at least one of version information and metadata information of the saved UI object and, other than the aforementioned information, may include various information depending upon a need for service implementation.

The resource receiver 212 makes a request for at least one of the UI resource and the content to the media storage, and receives at least one of the UI resource and the content in correspondence with the request.

The UI resource may be implemented using at least one of a web page, a bitmap for an application, and a graphic primitive for an application.

According to an embodiment, the UI resource may include a user interface receiving input of a user command for controlling a business service and the subscriber terminal device 210 from the outside.

The renderer 214 controls a request to the media storage based on a UI command received from the control command generator 130, receives at least one of the content and the UI resource from the resource receiver 212, and performs rendering.

A media storage including a content storage may store and maintain content such as video content, audio content, a real-time TV broadcast program, an on-demand program, SNS information, a chat message, a product, and an application.

According to an embodiment, the media storage may store content of a format corresponding to a specific protocol such as an MPEG-2 transport packet, MPEG-4, or DVB or content to which a specific protocol is not applied.

As another example, the media storage may store content partitioned in a predetermined manner. When the content is real-time broadcast content, the content storage may obtain broadcast content, may partition the obtained broadcast content in a predetermined manner, and may store the partitioned broadcast content.

In this case, the media storage may separately store and manage broadcast schedule information to obtain and store broadcast content.

The renderer 214 having received a control command may transmit a transmission request of broadcast content to a content storage based on a control command, the content storage may search additional data for partitioned content and then extract at least one content partition suitable for a corresponding request, and may synthesize the extracted at least one content partition and process the synthesized content as user content to transmit the processed content to the renderer 214.

Here, the media storage may transmit corresponding content to the subscriber terminal device 210 or another client device (not shown) by downloading or streaming.

In addition, the content storage may store at least one of broadcast content, content partition, and user content in a cloud storage space, and may also continuously provide content such that continuous content playback ('N-screen service') among a plurality of client devices held by a user is possible.

To accomplish this, the remote application server 100 may separately store and manage a content playback history for each client device.

The subscriber terminal device 210 according to an embodiment of the present disclosure may further include a local UI storage 215 for storing and maintaining a local UI resource.

When the renderer 214 receives a control command to perform rendering of the local UI resource from the control command generator 130, the renderer 214 may render at least one of content and a UI resource and a local UI resource based on a received UI command based on the UI command received from the control command generator 130.

More particularly, the resource receiver 212 may receive the local UI resource from the local UI storage 215 to transmit the received local UI resource to the renderer 214, and the renderer 214 may control reading of the local UI resource from the local UI storage 215 in correspondence with a control command and may render at least one of the local UI resource and the received UI resource and content.

The local UI resource is a user interface that has frequent interaction with a user and requires rapid response. For example, the local UI resource may be a UI resource corresponding to an Electronic Program Guide (EPG). The EPG displays a schedule of a broadcast program on a display screen. The user (viewer) may select a desired program through the EPG using the subscriber device 200 or may search for a desired program through criteria such as time, title, channel, genre, etc.

On the other hand, the UI resource stored and maintained in a UI resource storage may be a user interface that is rarely used by a user or has higher performance than the subscriber terminal device 210.

According to an embodiment, the renderer 214 may perform rendering for a resource in correspondence with user input resource directly, without depending on a control command from the remote application server 100, according to a user interactive input type.

According to an embodiment, the save UI controller 211, when determines that the saved UI object is being stored, may control the saved UI object to be transmitted to the renderer 214, and the renderer 214 may render a scene corresponding to a user interactive input by reusing the received saved UI object.

In addition, according to an embodiment, the renderer 214 may combine the saved UI object received from the save UI controller 211 with at least one of the content and UI resource received from the media storage to perform rendering.

The renderer 214 may change at least one characteristic of the stored saved UI object in correspondence with the control command received from the remote application server 100 to render a scene corresponding to a user interactive input. The at least one characteristic may include information on at least one of a size, a position, color, texture, and transparency of a UI object in a scene.

In addition, the subscriber terminal device 210 may further include a save UI storage 216 that stores a saved UI object. According to an embodiment, the save UI storage 216 may be a nonvolatile memory.

In addition, the save UI controller 211 of the subscriber terminal device 210 may re-store the reused saved UI object in the save UI storage 216 in correspondence with a current scene state.

According to an embodiment, the save UI controller 211 of the subscriber terminal device 210 may overwrite and store the saved UI object having a changed characteristic in the save UI storage 216, and may store information on at least one characteristic in correspondence with the stored saved UI object, along with the saved UI object, in the save UI storage 216.

In addition, the subscriber terminal device 210 may further include the transport module 213 forming a signal path with the remote application server 100 related to session connection, status information, a resource including a UI resource and content, and a control command. Preferably, the signal path is a single path.

The remote application server 100 may efficiently control the subscriber terminal device 210 through a signal path of the transport module 213.

More particularly, the remote application server 100 may efficiently control a local application installed in the subscriber terminal device 210 through the transport module 213 and may facilitate addition of a service to the subscriber terminal device 210 or change of a service therein.

Figure 3:
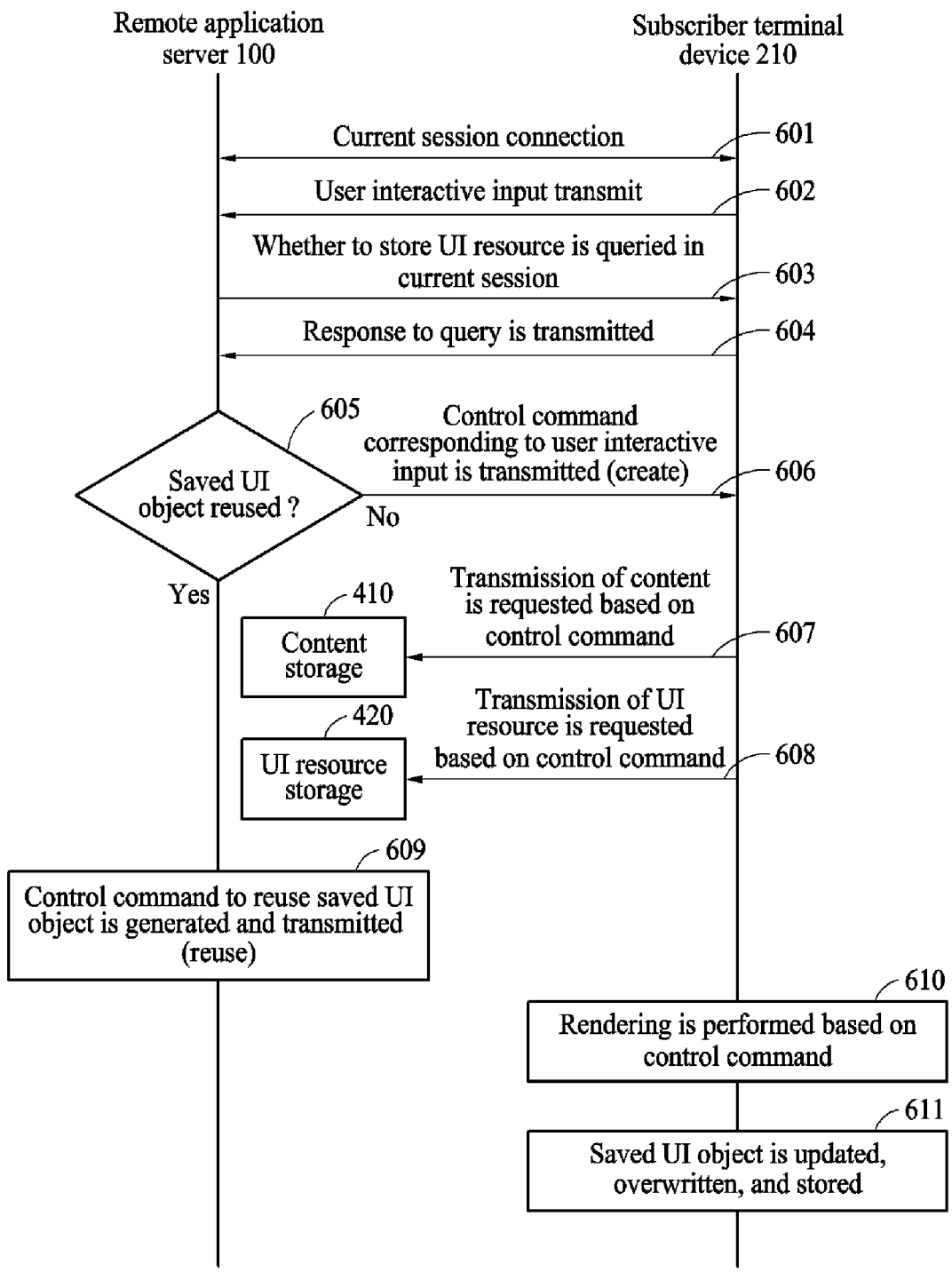
FIG. 3 is a flowchart illustrating a process of providing cloud-based UIs through a control command between a remote application server and a subscriber terminal device according to an embodiment of the present disclosure.

FIG. 3 is a flowchart illustrating a process of providing cloud-based UIs through a control command between a remote application server and a subscriber terminal device according to an embodiment of the present disclosure.

Referring to FIG. 3, in step 601, after a previous session between the remote application server 100 and the subscriber terminal device 210 is terminated, a current session is connected therebetween. Session connection between the remote application server 100 and the subscriber terminal device 210 may be performed by the subscriber terminal device 210 that transmits a session connection request to the remote application server 100.

Subsequently, in step 602, the subscriber terminal device 210 transmits a user interactive input received from an input device, and the remote application server 100 prepares to generate a control command for scene change in correspondence with the user interactive input.

Subsequently, in step 603, the remote application server 100 queries whether a saved UI object is stored in a UI resource in a current session connection.

The saved UI object refers to a UI object that is used upon rendering to configure a previous scene in correspondence with a user interactive input after session connection and stored in the subscriber terminal device 210. The saved UI object may be an object that is included in a UI resource used during configuration of a previous scene.

Subsequently, in step 604, the subscriber terminal device 210 determines whether the saved UI object is stored, and transmits response information on the determination result.

In step 605, the remote application server 100 determines whether reuse of the saved UI object is possible. When reuse of the saved UI object is possible, a control command (reuse command) to reuse the saved UI object is generated and the generated control command is transmitted to the subscriber terminal device 210 in step 609.

On the other hand, the remote application server 100 determines whether reuse of the saved UI object is possible, in step 605, and, when reuse of the saved UI object is impossible, a control command (create command) corresponding to a user interactive input is transmitted in step 606.

In this case, in step 607, the subscriber terminal device 210 requests transmission of content to the content storage 410 based on the control command received from the remote application server 100.

The content may include video content, audio content, a real-time TV broadcast program, an on-demand program, SNS information, a chat message, a product, and an application.

According to an embodiment, the content may include a format corresponding to a specific protocol such as an MPEG-2 transport packet, MPEG-4, or DVB.

In addition, according to another embodiment, the content may be content that is partitioned in a predetermined manner. For example, when the content is real-time broadcast content, a content storage may obtain broadcast content, may partition the obtained broadcast content in a predetermined manner, and may store the partitioned broadcast content.

In addition, in step 608, the subscriber terminal device 210 requests transmission of the UI resource to the UI resource storage 420 based on the control command received from the remote application server 100.

The UI resource may be implemented using at least one of a web page, a bitmap for an application, and a graphic primitive for an application.

According to an embodiment, the UI resource may provide a user interface receiving input of a user command for controlling a business service and the subscriber terminal device 210 from the outside.

In step 610, the subscriber terminal device 210 may perform rendering based on a control command. In step 611, the reused saved UI object may be undated, overwritten, and stored, or the UI object of the UI resource received from the UI resource storage 420 may be newly stored.

In step 610, the subscriber terminal device 210 may reuse the stored saved UI object in correspondence with a received control command to render a scene corresponding to the user interactive input.

According to an embodiment, in step 610, the subscriber terminal device 210 may receive at least one of the content and UI resource received from the media storage based on the received control command, and may render a scene corresponding to the user interactive input by combining the saved UI object and at least one of the received content and UI resource.

In addition, step 611 may further include a step of overwriting and storing the reused saved UI object in correspondence with a current scene state.

According to an embodiment, step 611 may further include a step of storing a saved UI object having a changed characteristic and storing, along with the saved UI object, information on at least one characteristic in correspondence with the stored saved UI object.

Figure 4:
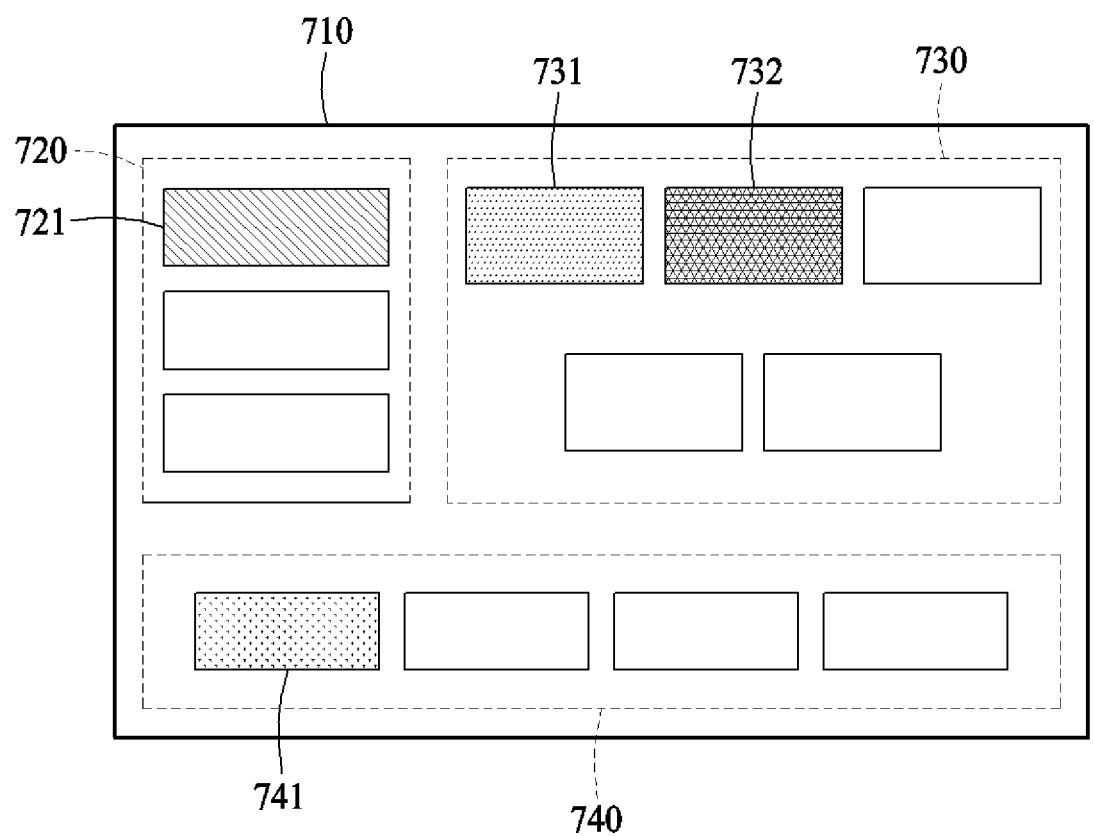
FIGS. 4 and 5 illustrate scene states in a previous session connection and a current session connection in a cloud-based UI provision system according to an embodiment of the present disclosure.
Figure 5:
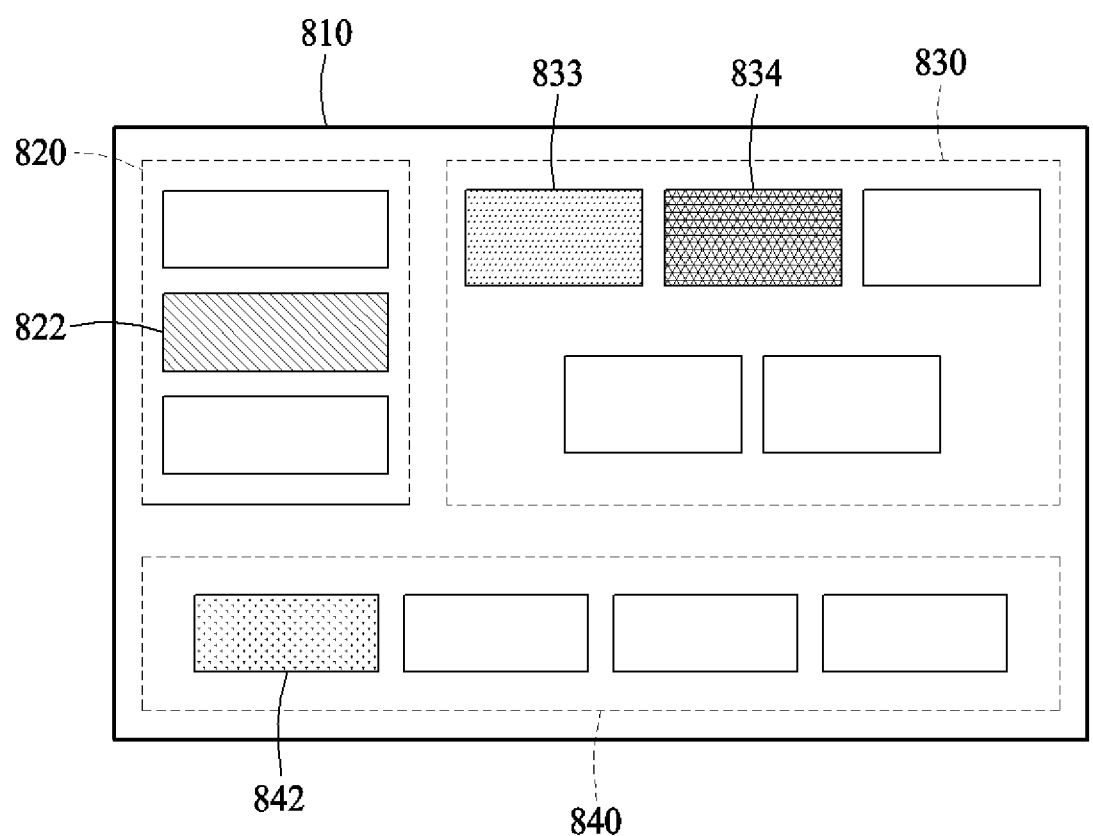

FIGS. 4 and 5 illustrate scene states in a previous session connection and a current session connection in a cloud-based UI provision system according to an embodiment of the present disclosure.

In particular, FIG. 4 illustrates a previous scene in a previous session connection, and FIG. 5 illustrates an embodiment of a current scene to be rendered through a subscriber terminal device in a current session connection. The subscriber terminal device may be supposed to render the current scene in the current session connection illustrated in FIG. 5, through a user interactive input, from the previous scene in the previous session connection illustrated in FIG. 4.

With regard to the previous scene and the current scene illustrated in FIGS. 4 and 5, one scene 710 or 810 includes at least one UI resource 720, 730, 740, 820, 830, or 840. The at least one UI resource 720, 730, 740, 820, 830, or 840 may include at least one UI object.

As described above, the remote application server queries a subscriber terminal device whether to store a UI resource in a current session connection with a subscriber terminal device in correspondence with user interactive input, determines whether to reuse the saved UI object stored in the subscriber terminal device based on response information to the query, generates a control command to reuse the UI object stored in a subscriber terminal device, and transmits the generated control command.

For example, the remote application server queries whether a subscriber terminal device stores a UI resource necessary for rendering of the current scene, to render the current scene, determines whether to reuse the saved UI object stored in the subscriber terminal device based on response information on whether a saved UI object for rendering of the current scene is stored in the subscriber terminal device, and generates a control command to reuse the UI object stored in a subscriber terminal device.

As illustrated in FIG. 4, the subscriber terminal device stores a saved UI object for at least one first UI resource 720, 730, or 740 corresponding to the previous scene state during the previous session connection, and transmits response information on whether to store the saved UI object of the at least one first UI resource 720, 730, or 740 to the remote application server.

The remote application server generates a control command to reuse the saved UI object based on the response information received from the subscriber terminal device and transmits the generated control command to the subscriber terminal device.

For example, the remote application server may determine that a position of a UI object 721 of a first UI resource 720 differs from that of a UI object 722 of a second UI resource 820 in a current session connection, and may change the position of the UI object 721 stored in the subscriber terminal device to generate a control command to configure a UI object 822 of the second UI resource 820 in a current scene 810.

In addition, the remote application server may determine that color and texture of each of UI objects 731 and 732 of a first UI resource 730 differ from those of UI objects 833 and 834 of a second UI resource 830 in a current session connection, and may change the color and texture of each of the UI objects 731 and 732 stored in the subscriber terminal device to generate a control command for configuring UI objects 833 and 834 of the second UI resource 830 on a current scene 810.

Similarly, the remote application server may determine that transparency of a UI object 741 of a first UI resource 740 differs from that of a UI object 842 of a second UI resource 840 in a current session connection, and may change the transparency of the UI object 741 stored in the subscriber terminal device to generate a control command to configure a UI object 842 of the second UI resource 840 in a current scene 810.

Figure 6:
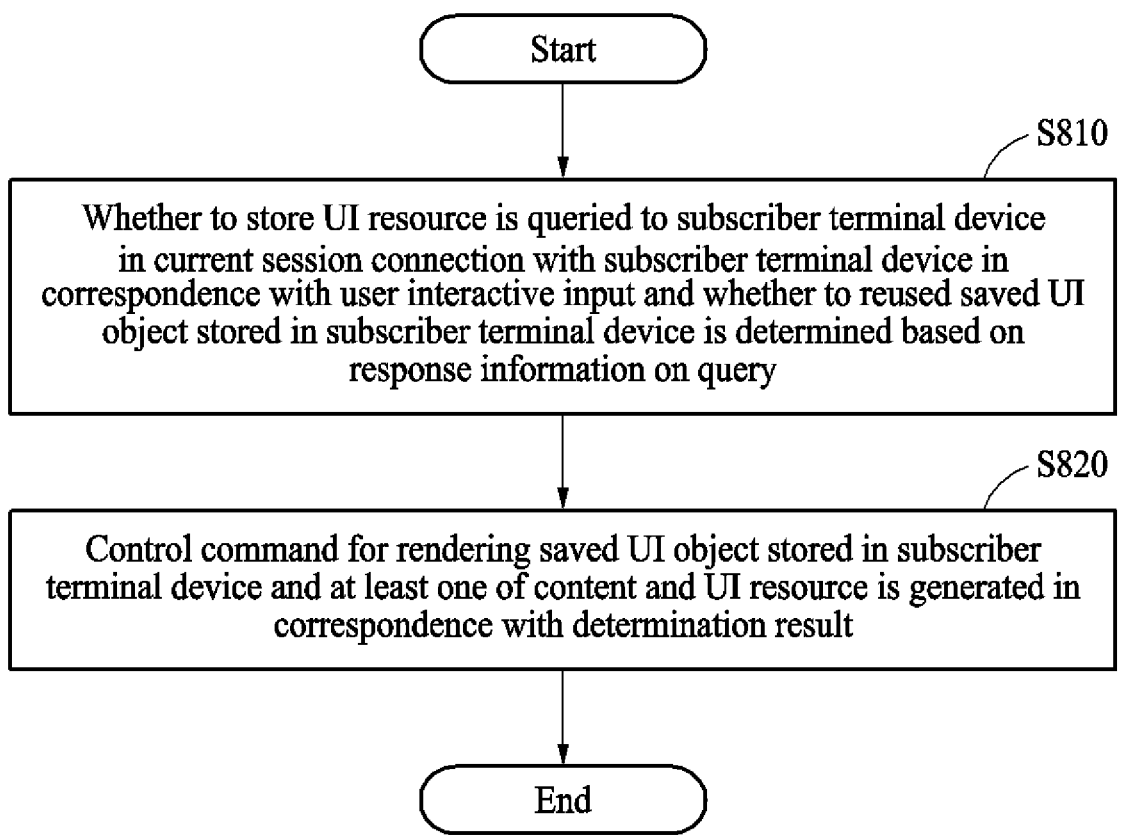
FIG. 6 is a flowchart illustrating a process of providing cloud-based UIs through a remote application server in a cloud-based UI provision system according to an embodiment of the present disclosure.

FIG. 6 is a flowchart illustrating a process of providing cloud-based UIs through a remote application server in a cloud-based UI provision system according to an embodiment of the present disclosure.

In S810, the remote application server queries whether to store a UI resource to a subscriber terminal device in a current session connection with a subscriber terminal device in correspondence with a user interactive input, and determines whether to reuse a saved UI object stored in the subscriber terminal device based on response information to the query.

Subsequently, in S820, a control command for rendering the saved UI object stored in the subscriber terminal device and at least one of content and a UI resource is generated in correspondence with the determination result.

For example, S820 may be a step of generating a control command for controlling reuse of the saved UI object, request of the UI resource to a resource storage, and request of content to a content storage.

In particular, when content or a UI resource is required to render a scene corresponding to the user interactive input, S820 may include a step of generating a control command to request transmission of content to the content storage.

In this case, S820 may be a step of generating a control command to render a current scene by combining the saved UI object with at least one of the received content and UI resource.

Hereinafter, the step of generating the control command of the remote application server is described in more detail with reference to FIG. 7.

Figure 7:
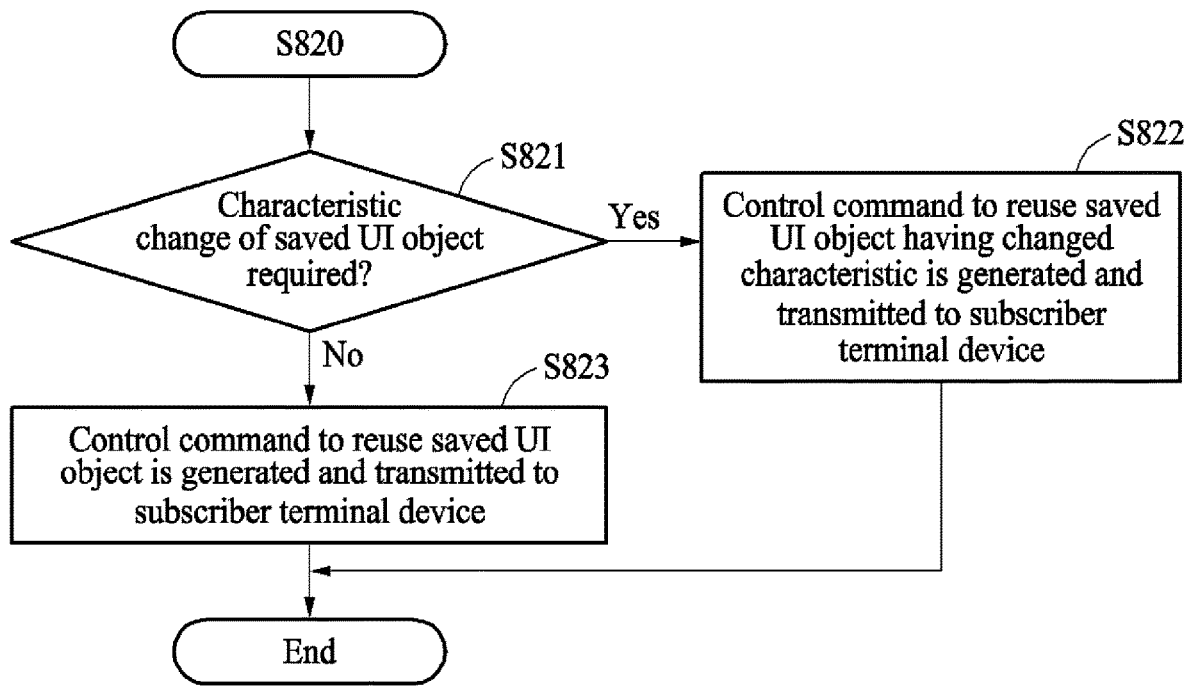
FIG. 7 is a flowchart illustrating a process of generating a control command to provide cloud-based UIs through a remote application server in a cloud-based UI provision system according to an embodiment of the present disclosure.

FIG. 7 is a flowchart illustrating the process of generating the control command to provide the cloud-based UIs through the remote application server in the cloud-based UI provision system according to an embodiment of the present disclosure.

Referring to FIG. 7, in S821, the remote application server determines whether characteristic change of the saved UI object is necessary, based on the response information received from the subscriber terminal device.

When the remote application server determines that characteristic change of the saved UI object is necessary, based on the response information received from subscriber terminal device in S821, a control command to change at least one characteristic of the saved UI object and configure a scene corresponding to the user interactive input is generated and the generated control command is transmitted to the subscriber terminal device in S822.

On the other hand, when the remote application server determines that characteristic change of the saved UI object is not necessary, based on the response information received from the subscriber terminal device in S821, a control command to reuse the saved UI object is generated and the generated control command is transmitted to the subscriber terminal device in S823.

Figure 8:
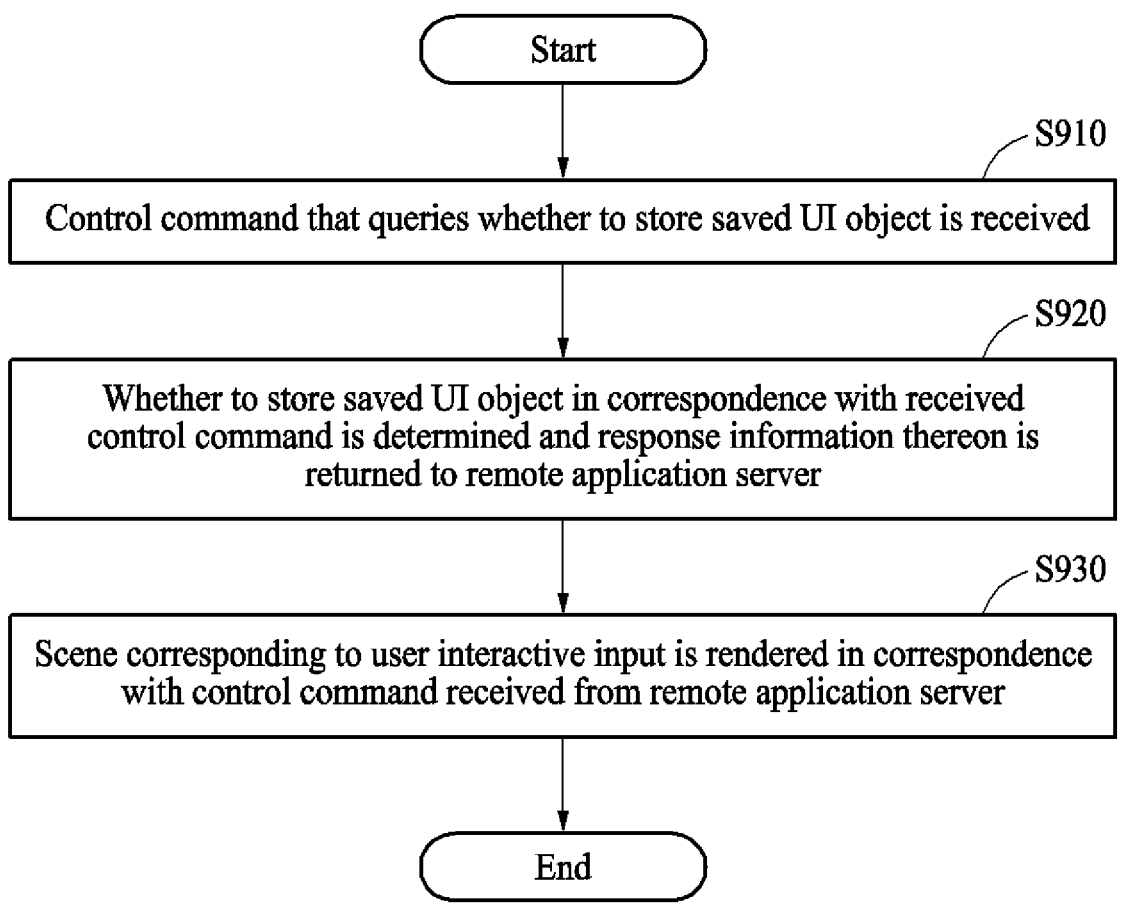
FIG. 8 is a flowchart illustrating a process of providing cloud-based UIs through a subscriber terminal device in a cloud-based UI provision system according to an embodiment of the present disclosure.

FIG. 8 is a flowchart illustrating a process of providing cloud-based UIs through a subscriber terminal device in a cloud-based UI provision system according to an embodiment of the present disclosure.

Referring to FIG. 8, in S910, a control command that queries whether to store a saved UI object in correspondence with user interactive input in a current session connection with a remote application server is received.

Subsequently, in S920, whether to store the saved UI object in correspondence with the received control command is determined and response information thereon is returned to the remote application server.

Subsequently, in S930, a scene corresponding to a user interactive input is rendered in correspondence with the control command received from the remote application server.

In this case, S930 may be a step of receiving at least one of content and a UI resource received from a media storage based on the control command received from the remote application server and rendering a current scene by combining the saved UI object with at least one of the received content and UI resource.

In addition, S930 may further include a step of re-storing the reused saved UI object in correspondence with a current scene state.

According to an embodiment, S930 may further include a step of overwriting and storing a saved UI object having a changed characteristic and storing, along with the saved UI object, information on at least one characteristic in correspondence with the stored saved UI object.

In addition, S930 may be a step of, when the saved UI object is not stored, rendering at least one of the content and received UI resource received from the media storage based on the control command received from the remote application server.

As apparent from the above description, in accordance with the present invention, a UI object stored in a subscriber terminal device may be reused in correspondence with user interactive input in a current session connection to control content and a UI resource to be rendered in a subscriber terminal device.

In addition, in accordance with the present disclosure, an amount of control commands transmitted to a subscriber terminal device from a remote application server may be drastically reduced by reusing a UI object stored in a subscriber terminal device.

In addition, in accordance with the present disclosure, cost reduction in developing an application directly related to introduction of a new services or service experience of customers may be accomplished by receiving a content resource and a UI resource to a subscriber terminal device from a storage separated from a remote application server according to a control command of a remote application server and rendering the content resource and the UI resource.

In addition, in accordance with the present disclosure, since a process of obtaining content and a UI resource and combining the same is not performed in the remote application server, load of the remote application server may be significantly reduced.

In addition, in accordance with the present invention, consistent UIs may be provided to a subscriber device without development, porting, and test of applications for different STB types having different specifications, thereby allowing rapid service launch and increased customer satisfaction.

Further, in accordance with the present invention, UIs capable of being implemented even in a low-performance subscriber terminal device may be provided, thereby reducing subscriber terminal device purchase cost and service development cost.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform the operations of the embodiments, and vice versa.

Although the present invention has been described through limited embodiments and figures, the present invention is not intended to be limited to the embodiments. Those skilled in the art will appreciate that various modifications, additions and substitutions are possible, without departing from the scope and spirit of the invention. For example, although the described techniques are performed in a different order from the described method, and/or constituents, such as the described systems, structures, devices, and circuits, are combined in different manners and forms from the described method or substituted or replaced by other constituents or equivalents, appropriate results can be achieved.

It should be understood, therefore, that there is no intent to limit the invention to the embodiments disclosed, rather, the invention is to cover all modifications, equivalents, and alternatives falling within the spirit and scope of the invention as defined by the claims.

What is claimed is:

1. A remote application server, comprising:
 a user interface (UI) reuse determining processor configured to query whether a saved UI object is stored in a subscriber terminal device in a current session connection with the subscriber terminal device in correspondence with a user interactive input and to determine whether to reuse the saved UI object stored in the subscriber terminal device based on response information to the query from the subscriber terminal device, wherein the saved UI object is a UI object used for configuration of a previous scene in correspondence with a user interactive input and is stored in the subscriber terminal device after session connection;
 a control command generator configured to generate a control command to reuse the saved UI object stored in the subscriber terminal device in correspondence with a determination result of the UI reuse determining processor; and
 a controller configured to control generation of the control command and transmission of the generated control command to the subscriber terminal device,
 wherein the UI reuse determining processor is further configured to query whether to store a UI resource for rendering a current scene to the subscriber terminal device in the current session connection with the subscriber terminal device in correspondence with a user interactive input and to determine whether to reuse the saved UI object stored in the subscriber terminal device based on response information to the query from the subscriber terminal device, wherein the UI resource is used for configuration of the current scene and includes a plurality of UI object,
 wherein the subscriber terminal device is configured to overwrite and store the saved UI object having a changed characteristic in a save UI storage, and to store information on at least one characteristic in correspondence with the saved UI object, along with the saved UI object, in the save UI storage,
 wherein the subscriber terminal device further comprises a transport module configured to form a signal path with the remote application server related to session connection, status information, a resource including the UI resource and content, and the control command, and
 wherein the remote application server is configured to control the subscriber terminal device through the signal path of the transport module.

2. The remote application server according to claim 1, wherein the remote application server is configured to control a content storage to obtain a broadcast content, partition the obtained broadcast content in a predetermined manner, and store the partitioned broadcast content, wherein the remote application server is configured to analyze status information of the subscriber terminal device and, when the status information of the subscriber terminal device is a reception standby state of the partitioned and stored broadcast content, to generate a control command for transmitting the partitioned and stored broadcast content to the subscriber terminal device.

3. The remote application server according to claim 1, wherein the UI reuse determining processor is configured to determine whether to update the saved UI object by analyzing version information of the saved UI object based on the response information from the subscriber terminal device, and
 the controller is configured to generate a control command to update the saved UI object and to control the generated control command to be transmitted to the subscriber terminal device.

4. The remote application server according to claim 1, wherein the UI reuse determining processor is configured to determine whether to change at least one characteristic of the saved UI object stored in the subscriber terminal device based on response information to the query, and
 the controller is configured to control generation of a control command corresponding to the user interactive input by changing the at least one characteristic of the stored UI object.

5. The remote application server according to claim 4, wherein the at least one characteristic comprises information on at least one of a position, color, texture, and transparency of the saved UI object in a scene.

6. The remote application server according to claim 1, wherein the controller, when the UI reuse determining processor determines that the reuse of the saved UI object stored in the subscriber terminal device is not possible, is configured to control generation of a control command to render a scene corresponding to the user interactive input by using at least one of content and a UI resource from a media storage.

7. A subscriber terminal device, comprising:
 a save UI controller configured to receive a query about whether to store a user interface (UI) resource from a remote application server in a current session connection with the remote application server in correspondence with a user interactive input, determine whether to store the UI resource in the subscriber terminal device, and return response information to the remote application server, wherein the UI resource is used for configuration of a current scene and includes a plurality of UI object;
 a resource receiver configured to request at least one of content and a UI resource to a media storage in correspondence with a control command received from the remote application server and to receive at least one of content and a UI resource from the media storage corresponding to the request; and
 a renderer configured to reuse a saved UI object in correspondence with the received control command or to render a current scene corresponding to the user interactive input by combining the saved UI object and at least one of the content and UI resource received from the resource receiver, wherein the saved UI object is a UI object used for configuration of a previous scene in correspondence with a user interactive input and is stored in the subscriber terminal device after session connection,
 wherein the save UI controller is configured to receive a query about whether the saved UI object is stored in the subscriber terminal device from the remote application server in a current session connection with the remote application server in correspondence with a user interactive input and return response information to the remote application server,
 wherein the save UI controller is configured to update the saved UI object by overwriting the saved UI object having a changed characteristic in the subscriber terminal device,
 wherein the save UI controller is configured to store the saved UI object having a changed characteristic and information on at least one characteristic in correspondence with the saved UI object, along with the saved UI object, in a save UI storage,
 wherein the subscriber terminal device further comprises transport module configured to form a signal path with the remote application server related to session connection, status information, a resource including the UI resource and content, and the control command, and
 wherein the remote application server is configured to control the subscriber terminal device through the signal path of the transport module.

8. The subscriber terminal device according to claim 7, wherein the renderer is configured to change the at least one characteristic of the saved UI object in correspondence with the received control command to render the current scene by reusing the saved UI object having the changed characteristic.

9. The subscriber terminal device according to claim 7, wherein the subscriber terminal device further comprises a save UI storage storing the saved UI object.

10. The subscriber terminal device according to claim 9, wherein the save UI storage is a nonvolatile memory.

11. The subscriber terminal device according to claim 7, wherein the subscriber terminal device is configured to store a UI object used for rendering of the scene selectively.

12. The subscriber terminal device according to claim 7, further comprising a local UI storage configured to store and maintain a local UI resource, wherein the renderer is configured to render at least one of the content and UI resource received from the resource receiver and the local UI resource from the local UI storage.

13. The subscriber terminal device according to claim 7, wherein the local UI resource is UI that has frequent interaction with a user and requires rapid response and the UI resource stored and maintained in a UI resource storage is a UI that is rarely used by a user.

14. The subscriber terminal device according to claim 7, wherein the subscriber terminal device re-store the saved UI object reused in correspondence with the current scene.

15. The subscriber terminal device according to claim 7, wherein the subscriber terminal device is configured to request transmission of content to a content storage in the media storage based on a control command from the remote application server when the reuse of the saved UI object is not possible.

16. The subscriber terminal device according to claim 7, wherein the subscriber terminal device is configured to render at least one of the content UI resource received from the media storage based on the control command received from the remote application server when the saved UI object is not stored in the subscriber terminal device, wherein the media storage is separate from the remote application server.

* * * * *